(12) United States Patent
Hreha et al.

(10) Patent No.: US 10,370,508 B1
(45) Date of Patent: Aug. 6, 2019

(54) HIGH TEMPERATURE CHEMICAL COMPOSITIONS AND COMPOSITES PRODUCED THEREFROM

(71) Applicant: Jalapeno Holdings, LLC, Bellbrook, OH (US)

(72) Inventors: Richard D. Hreha, Centerville, OH (US); Joel P. Brubaker, Dayton, OH (US); Patrick J. Hood, Bellbrook, OH (US)

(73) Assignee: Jalapeno Holdings, LLC, Bellbrook, OH (US)

( * ) Notice: Subject to any disclaimer, the term of this patent is extended or adjusted under 35 U.S.C. 154(b) by 37 days.

(21) Appl. No.: 15/635,794

(22) Filed: Jun. 28, 2017

Related U.S. Application Data

(60) Provisional application No. 62/355,634, filed on Jun. 28, 2016.

(51) Int. Cl.
*C08J 5/04* (2006.01)
*C08G 73/02* (2006.01)

(52) U.S. Cl.
CPC .............. *C08J 5/042* (2013.01); *C08G 73/02* (2013.01); *C08G 73/0273* (2013.01)

(58) Field of Classification Search
CPC ................ C08G 73/02; C08G 73/0246; C08G 73/0253; C08G 73/0273; C08J 5/042
See application file for complete search history.

(56) References Cited

U.S. PATENT DOCUMENTS

2014/0242519 A1\* 8/2014 Sagehashi ............... G03F 7/038
430/285.1

OTHER PUBLICATIONS

Ahmed et al., "Thermal insulation by heat resistant polymers for solid rocket motor insulation", Journal of Composite Materials 46(13) pp. 1549-1559, 2011.
De Almedia et al., "Processing and characterization of ablative composites used in rock motors", Journal of Reinforced Plastics & Composites, vol. 33(16) pp. 1474-1484, 2014.
Natali et al., "Ablative properties of carbon black and MWNT/ phenolic composites: A comparative study", Composites: Part A 43, pp. 174-182, 2012.
Ogasawara et al., "Thermal Response and Ablation Characteristics of Carbon Fiber Reinforced Composite with Novel Silicon Containing Polymer MSP", Journal of Composite Materials, vol. 36, No. 2, pp. 143-157, 2002.
Parkar et al., "Ablation characteristics of an aromatic thermosetting copolyester/carbon fiber composite", Journal of Composite Materials, 46(15), pp. 1819-1830, 2011.
Sabagh et al., "Thermochemical erosion and thermophysical properties of phenolic resin/carbon fiber/graphite nanocomposites", Journal of Reinforced Plastics & Composites, vol. 35(24), pp. 1814-1825, 2016.
Sandor, "PBI (Polybenzimidazole): Synthesis, Properties and Applications", High Performance Polymers, vol. 2, No. 1, pp. 25-37, 1990.
Williams et al., "Thermal Protection Materials: Thermophysical Property Data", NASA Reference Publication 1289, 1992.
Zhang et al., "Addition-curable phthalonitrile-functionalized novolac resin", High Performance Polymers, 24(5), pp. 398-404, 2012.
Brunovska et al., "Thermal Properties of Phthalonitrile Functional Polybenzoxazines", Thermochemica Acta Aug. 2000: 195-203.
"Game Changing Development Program, Potential Industry/NASA Partnership in the Development and Assessment of High Performance Thermal Protection System Materials", NNH15ZOA005L. Mar. 2, 2015. NSPIRES. Jul. 3, 2015.

\* cited by examiner

*Primary Examiner* — Edward J Cain
(74) *Attorney, Agent, or Firm* — Dinsmore & Shohl LLP

(57) ABSTRACT

Chemical compositions are provided that include at least one of Formula I or Formula II:

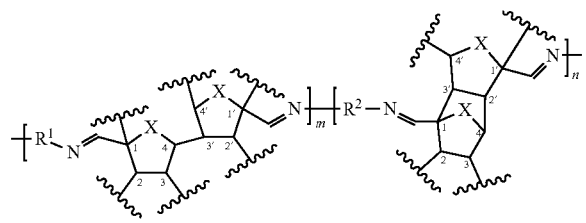

FORMULA I

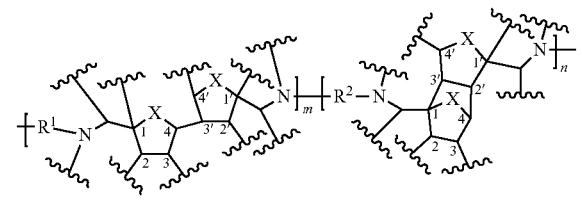

FORMULA II where n and m are integers, at least one of $R^1$ or $R^2$ comprises an aromatic moiety, and X is selected from the group consisting of $CH_2$, NH, O, S, $SO_2$, and combinations thereof. Composites formed from the chemical composition and at least one reinforcement material are also provided.

18 Claims, 2 Drawing Sheets

HIGH TEMPERATURE CHEMICAL COMPOSITIONS AND COMPOSITES PRODUCED THEREFROM

CROSS-REFERENCE TO RELATED APPLICATIONS

This application claims priority to U.S. Provisional Application 62/355,634, filed Jun. 28, 2016, which is incorporated by reference herein in its entirety.

TECHNICAL FIELD

Embodiments of the present disclosure generally relate to chemical compositions and composites produced therefrom. Specifically, embodiments of the disclosure relate to high temperature chemical compositions and high temperature composites containing the chemical composition and at least one reinforcement material.

BACKGROUND

Polymeric composites are used in numerous industries such as chemical, transportation, construction, electrical and electronic appliance. These composites possess wide-ranging beneficial properties, such as lightweight, corrosion resistance, high specific stiffness, and excellent toughness, electrical and thermal insulation. Comparing with other materials such as ceramic and metal, the only drawback of polymeric composite is their relatively low maximum temperature of operation, which is generally limited by either the glass transition temperature or decomposition temperature of the polymer matrix. The current state-of-the-art high temperature polymer, PMR-15, is a polyimide-based resin that can be made into fiber-reinforced polymer composite via prepreg processing, resulting in a service temperature up to about 290° C. (about 550° F.). Such composite has been used widely, especially among aerospace applications that require exposure to high temperature, including engine bypass ducts, nozzle flaps, and aircraft engine components.

In contrast, silicon carbide based ceramic matrix composites can withstand temperature greater than 1316° C. (2400° F.), but they are generally much more difficult and expensive to produce. Thus it is desirable to significantly increase the thermal performance of organic polymer matrix composite to produce lower cost, higher performance material for high temperature applications.

Composite panels are widely used in aircraft parts, automobile parts, and in construction of residential and commercial buildings, where structures are required that are lightweight and strong. Composite panels are typically made with reinforcement material embedded in an organic polymer matrix. The reinforcement may be a fiber reinforcement or inorganic fillers. Many polymers that are widely used in making composite panels, such as epoxy and vinyl ester, are inflammable. Furthermore, some polymers emit noxious or toxic fumes when burning, which can substantially increase the number of injuries and deaths in case of accidental fire that involves such polymers. Certain types of polymers exhibit fire retardant properties, such as phenolic resins and polyimide resins; however, these polymers may be inherently brittle or difficult to process, and thus expensive to make into void free composites that provide low-cost structural composites that exhibit good mechanical performance.

SUMMARY

As such, there is an ongoing industry need for resins and composites produced therefrom with improved properties, such as improved mechanical properties, thermal stability, and flame resistance. The present embodiments address these needs by providing high temperature chemical compositions and composites produced therefrom with improved thermal properties.

Embodiments of the present disclosure relate to chemical compositions comprising at least one of Formula I or Formula II:

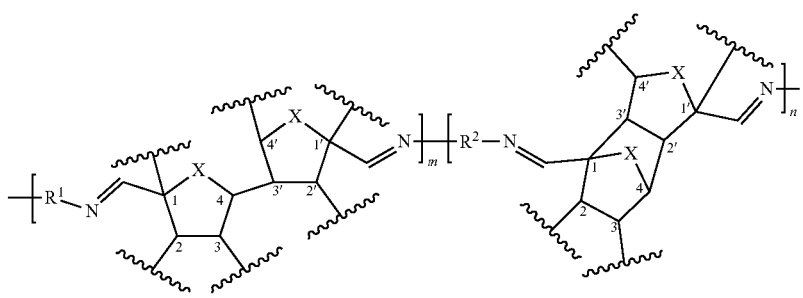

FORMULA I

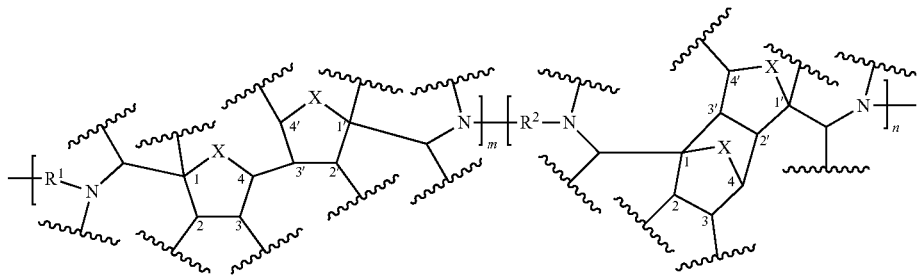

FORMULA II where n and m are each an integer greater than or equal to 1, at least one of $R^1$ or $R^2$ comprises an aromatic moiety, and X is selected from the group consisting of $CH_2$, NH, O, S, $SO_2$, and combinations thereof.

Further embodiments of the present disclosure relate to composites comprising the chemical composition and at least one reinforcement material.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
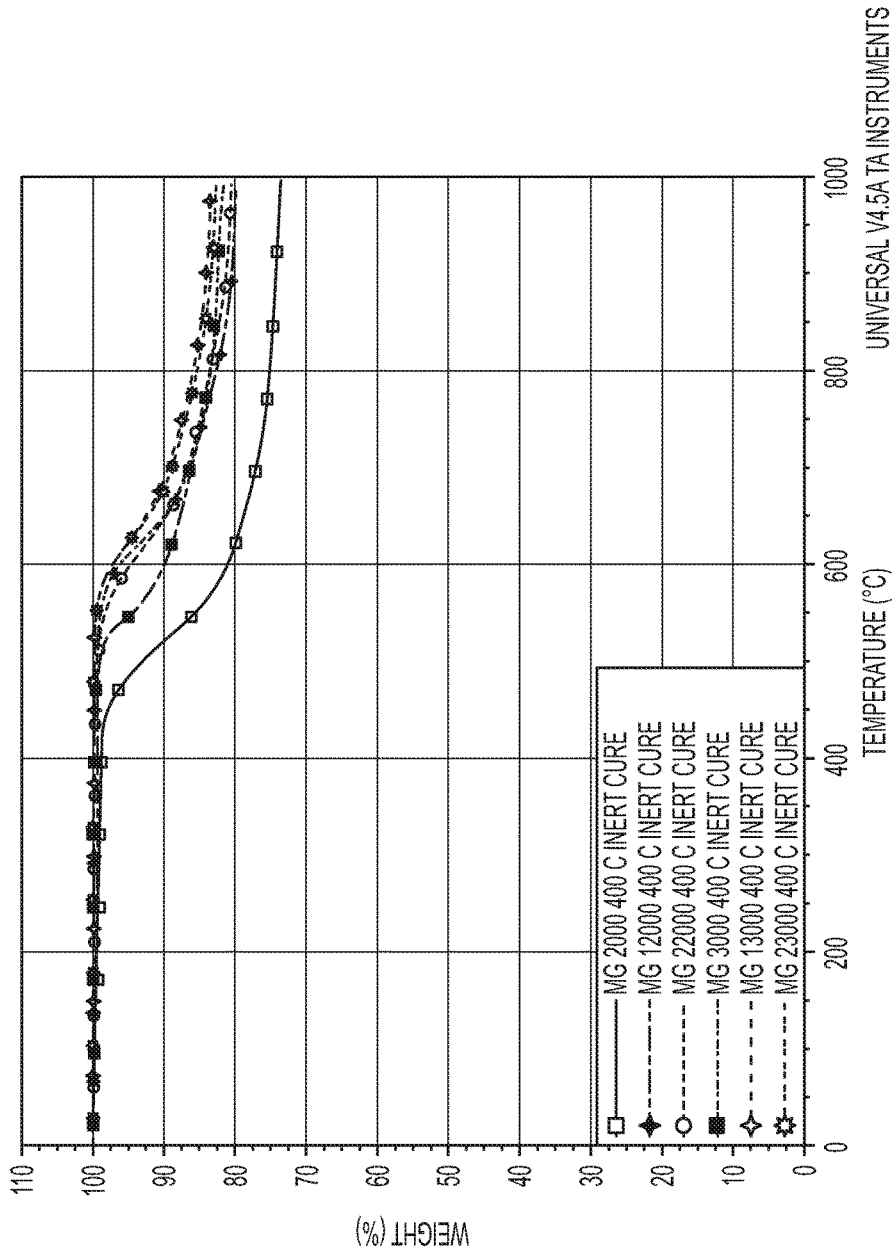
FIG. 1 is a graph of the mass loss versus temperature in nitrogen atmosphere for six different samples according to embodiments described herein as measured using thermal gravimetric analysis (TGA)
Figure 2:
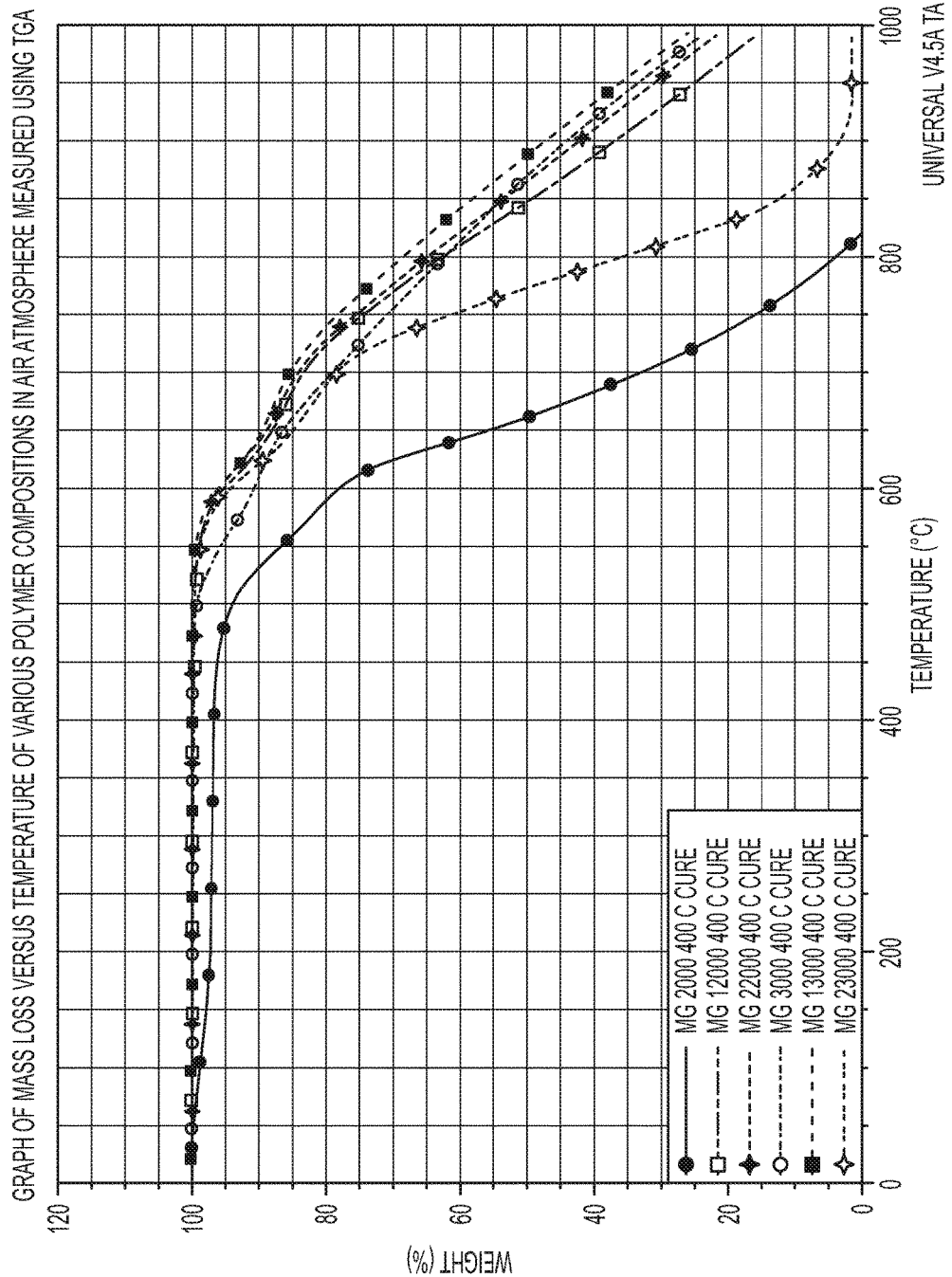
FIG. 2 is a graph of the mass loss versus temperatures in air atmosphere for six examples according to embodiments described herein as measured using TGA.

Embodiments of the present disclosure generally relate to chemical compositions and composites produced from the chemical compositions. The chemical composition includes at least one of Formula I or Formula II:

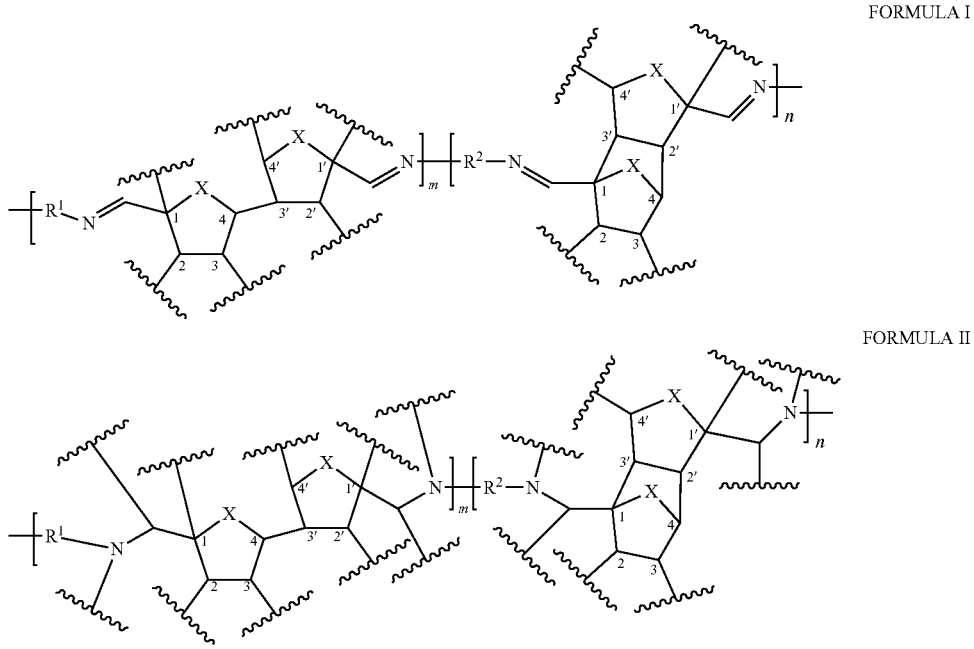

FORMULA I

FORMULA II where n and m are each an integer greater than or equal to 1, at least one of $R^1$ or $R^2$ includes an aromatic moiety, and X is one or more of $CH_2$, NH, O, S, $SO_2$, and combinations thereof. It should be understood that a "group" is used to refer to a moiety containing at least one atom. For instance, an "oxygen group" is used to refer to any moiety containing oxygen, such as a single oxygen atom or a moiety containing one or many oxygen atoms. In any of the formulas depicted throughout this disclosure, an unconnected bond, or a bond between a bracket "—[—X" refers to an open covalent bond, which may be a single, double, or even a triple bond between that constituent and another molecule. Similarly, in any of the formulas depicted throughout this disclosure, a wavy bond, "⁓" represents a potentially cross-linkable site in which the composition may or may not crosslink if placed under appropriate cross-linking conditions.

In Formulas I and II, n and m may be independently selected and may be any suitable integer greater than or equal to 1. In some embodiments, n, m, or both may be from 1 to 500, such as from 1 to 300, from 1 to 200, or from 1 to 100. For instance, n, m, or both may be from 20 and 200, such as from 50 and 150, from 20 and 100, or from 20 to 150.

As mentioned, at least one of $R^1$ or $R^2$ includes an aromatic moiety. Without being bound by any particular theory, aromaticity in the oligomer backbone of the chemical composition may provide improved thermal stability and flame resistance, by restricting movement and preventing rotation of the polymer backbone to increase glass transition temperature as the composition is heated, and increase the char formation when exposed to fire. Any suitable aromatic moiety may be chosen for $R^1$, $R^2$, or both, which may vary based on the desired application of use. In some embodiments, $R^1$ or $R^2$, or both, may contain at least one of a phenyl group, a naphthyl group, a benzyl group, a 4-cyanophenyl group or combinations of any these. $R^1$, $R^2$, or both may additionally contain an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a methyl group, a propyl group, a dimethylamino group, a boronic acid group, or combinations thereof. In some particular embodiments, $R^1$ or $R^2$, or both, may include, (1-(5-(1-(5-Formyl-2-furfyl)-1-methylethyl)-2-furfyl)-1-methylethyl), diphenylsulfone, diphenylsulfone, diphenyl ether, 1,3-bis(phenoxy)-benzene, moieties, or derivatives obtained from 4,4'-(1,3-phenylenedioxy)dianiline, 1,3-bis(3-aminophenoxy)benzene, 4,4'-oxydianiline, 4-aminophenyl sulfone, 3-aminophenyl sulfone, isophthalaldehyde, or combinations of any of these.

As mentioned, X may be one or more of $CH_2$, NH, O, S, $SO_2$. In some particular embodiments, X may be O, NH, $CH_2$ or S. In some embodiments, X may be O.

In some embodiments, as stated, the chemical composition may have improved thermal stability and reduced flammability. As such, in some embodiments, the chemical composition may have a glass transition temperature ($T_g$) of greater than or equal to 400° C. The chemical composition may have a glass transition temperature of greater than or equal to 420° C., such as greater than or equal to 450° C., greater than or equal to 475° C., greater than or equal to 500° C., or greater than or equal to 550° C. In some embodiments, the chemical composition may have a glass transition temperature of greater than or equal to 575° C., such as greater than or equal to 600° C., greater than or equal to 625° C., greater than or equal to 650° C., or greater than or equal to 700° C. Without being bound by any particular theory, the numerous crosslinking sites indicated in the chemical structures of Formula I and II may contribute to the increase $T_g$, increase in thermal stability and flame resistance. The presence of a highly crosslinked structure restrict the movement of the polymer backbone. It may also increase the number of strong carbon-carbon bonds that need to be broken in a fire situation (i.e. thermal degradation) to produce small volatile organic molecules that can act as fuel to sustain and spread the fire. In addition, the aromatic $R^1$ or $R^2$ group may contribute to the increased $T_g$, as the aromatic moiety may restrict rotational freedom of the polymer backbone in the chemical composition.

The chemical composition may have a mass loss of less than or equal to 10 wt. % in nitrogen at temperatures of greater than or equal to 900° C. when measured using thermal gravimetric analysis (TGA). In some embodiments, the chemical composition may have a mass loss of less than or equal to 10 wt. %, or even less than or equal to 5 wt. % in nitrogen at temperatures of greater than or equal to 650° C. when measured using TGA. In some embodiments, the chemical composition may have a mass loss of less than or equal to 2 wt. %, less than or equal to 1.5 wt. %, or even less than or equal to 1 wt. % at greater than or equal to 400° C., such as 500° C., 550° C., or 600° C. under nitrogen using TGA. Thermal gravimetric analysis is used to evaluate the thermal stability of a material. Without being bound by any particular theory, the more thermally stable a compound is, the smaller the observed change in mass will be over a large temperature range. Many conventional polymers may begin to melt or degrade below 300° C. Materials may begin to degrade for numerous reasons, including chemical reactions (such as oxidation), and breaking of chemical bonds within the polymer backbone (i.e. decomposition).

In some embodiments, the chemical composition may have a mass loss of less than or equal to 10 wt. % mass loss in air at temperatures of greater than or equal to 600° C. when measured using TGA. The chemical composition may have a mass loss of less than or equal to 5 wt. % in air at temperatures of greater than or equal to 600° C. when measured using TGA. In some embodiments, the chemical composition may have a mass loss of less than or equal to 2 wt. %, less than or equal to 1.5 wt. %, or even less than or equal to 1 wt. % at greater than or equal to 300° C., such as 400° C., 450° C., 500° C., or 550° C. under air using TGA. Again without being bound by any particular theory, polymers may experience more mass loss on average under air as opposed to nitrogen conditions, as nitrogen is an inert, nonreactive gas, whereas the presence of oxygen in the air further exacerbates potential oxidation reactions occurring.

These improved qualities may allow the chemical composition to be suitable for use in numerous industries. For instance, in some embodiments, the chemical composition may be used in the architecture, coating, composite, construction, oil and gas, mining, defense, space, aerospace, automotive, marine, and electronic industries. In some particular embodiments, the chemical composition may be used as heat shield or insulation for re-entry vehicles, decorative cladding for skyscraper buildings, fireproof wall panels, fire bricks, casing for oil and gas wells, aircraft and ship interior panels, automobile body parts, fire resistant panels for armored vehicles, or insulation housing for thermal batteries.

Embodiments of the disclosure also relate to composites containing the chemical composition and at least one reinforcement material. The chemical composition may be in accordance with any of the embodiments previously described.

The chemical composition may be used as a matrix material with a reinforcement material to form the composite. Any suitable reinforcement material may be used, which may be chosen based on the desired application of use. In some embodiments, the reinforcement material may be any of carbon fiber, glass fiber, aramid fiber, polymer fiber, felt material, carbon felt, aerogel, syntactic material (e.g., syntactic foam), random mats, scrims, chopped fibers, fiber knits, unidirectional fiber plies, three-dimensional fiber weaves, three-dimensional fiber preforms, prepreg fiber, plain weave fabrics, twill fabrics, harness satin fabrics or combinations thereof. The syntactic material may include chopped glass fibers, porous glass beads, and microballoons. In some embodiments, glass microballoons may be used; however, various other microballoon types, such as ceramic and carbon are contemplated. In some embodiments the reinforcement material may comprise aramid fibers, carbon fibers or glass fibers. Aramid fiber may be commercially available under the trade name Kevlar, produced by DuPont (Wilmington, Del.).

In some embodiments, the reinforcement material may be carbon felt, which may be used because of its thermal properties and ability to provide a thick 3-dimensional reinforcement network within the composite material. Such reinforcement network may help to reduce the problem of composite delamination often encountered during mechanical impact or thermal shock due to extreme temperature difference between surface and interior of the composite. For instance, in some embodiments the material may have a thickness of greater than or equal to 0.5 inches, such as greater than or equal to 0.6 inches or 0.75 inches, or greater than or equal to 1 inch, or 1.5 inches.

The reinforcement material may be a unidirectional fibrous or a woven fabric material, and in some embodiments, may be arranged in a 0° and 90° or 0°, 45°, and 90° orientation between layers to provide structural support or may be in any other layup or laminate arrangements known in the industry. The reinforcement material may be in a braided, woven, plain weave, twill weave, satin weave, in a symmetric or non-symmetric laminate stack, in any other known configuration, or in any combination of configurations. Depending on the industrial application and the part thickness desired, it may be desirable to use multiple layers of the reinforcement material to form a layup. In some embodiments, the layup may comprise up to 300 layers of material, however, the present process is suitable for greater than 300 layers as well. In specific embodiments, the layup may include from 1 to 100 layers, or from 4 to 30 layers of reinforcement material.

The chemical composition and the composite may be used, or may be formulated for use, in many industries. The composite may be suitable for use in numerous industries, including, for instance, architecture, coating, composite, construction, oil and gas, mining, defense, space, aerospace, automotive, marine, and electronic industries. In some embodiments, the composite may be a fiber reinforced composite, or it may be a particulate-reinforced composite. For example, the composite may be used as a fiber-reinforced polymer composite or particulate-reinforced polymer composite panels, parts, or structures in the architecture, construction, oil and gas, mining, space, defense, automotive, marine, or manufacturing industries. In other embodiments, the composite may be used in chemical, or electronic industries. In some particular embodiments, the chemical composition may be used as heat shield for re-entry vehicles, decorative cladding for skyscraper buildings, fireproof wall panels, fire bricks, composite casing for oil and gas wells, aircraft and ship interior panels, automobile body parts, fire resistant panels for armored vehicles, or insulation housing for thermal batteries.

The chemical composition may also have an improved flammability. The inherent flammability of a material can be quantitatively measured through the use of oxygen consumption calorimetry, which is a standard technique in the industry to measure inherent flammability under ASTM E-1345/ISO 5660. A cone calorimeter or a micro-combustion calorimeter may be used to measure oxygen consumption calorimetry and some of the parameters measured by the cone calorimeter include: (i) Time to ignition (Tig), which is the time to sustained ignition of the sample. It is generally considered that earlier times to ignition mean that the sample is easier to ignite under a particular heat flux. (ii) Peak Heat Release Rate (Peak HRR), which is the maximum value of the rate of heat release measured in units of $kW/m^2$ during combustion of the sample. The higher the peak HRR, the more likely the flame will self-propagate on the sample in the absence of an external flame or ignition source. (iii) Total Heat release (THR), which is measured in units of kJ/g and represent the total heat released from the sample during burning. The higher the THR, the higher the energy content of the tested sample. THR can be correlated roughly to the fuel load of a material in a fire, and is often affected by polymer chemical structure. (iv) Average Heat Release Rate (Avg. HRR), which is the average value of heat release rate over the entire heat release rate curve for the material during combustion of the sample. (v) Total Smoke Release, which is the total amount of smoke generated by the sample during burning in the calorimeter. The higher the value, the more smoke generated either due to incomplete combustion of the sample, or due to polymer chemical structure. The chemical composition may have a Tig ranges from 10 seconds to 100 seconds, or it may range from 60 seconds to 85 seconds under a heat flux of 75 $kW/m^2$ with an exhaust flow of 24 L/s under the standardized cone calorimeter procedure (ASTM E1354-12). The chemical composition may also has a Peak HRR value ranges from 5 W/g to 44 W/g (ASTM D7309). The chemical composition may also has a THR ranges from 0.8 kJ/g to 5.3 kJ/g. The chemical composition may also has an Average HRR value of 40 to 80 W/g. In comparison, a standard polystyrene sample may have a Peak HRR greater than 1000 W/g and a THR of 40 kJ/g. The chemical composition may also have a Total Smoke Release ranges from 2 $m^2/m^2$ to 6 $m^2/m^2$. As another reference, the DEPARTMENT OF DEFENSE TEST METHOD STANDARD: FIRE AND TOXICITY TEST METHODS AND QUALIFICATION PROCEDURE FOR COMPOSITE MATERIAL SYSTEMS USED IN HULL, MACHINERY, AND STRUCTURAL APPLICATIONS INSIDE NAVAL SUBMARINES (i.e. MIL-STD-2031) sets a very high standard for fire resistant material specify that the material has to have Peak HRR lower than 100.0 $kW/m^2$ (versus 70 to 100 $kW/m^2$ for the disclosed composite), Avg. HRR over 300 seconds of 100 $kW/m^2$ and Tig of greater than or equal to 90.0 seconds.

The chemical composition may also have an improved char yield, referring to the percentage of solid material obtained at the end of pyrolysis. The higher the char yield, the more carbon/inorganic materials are left behind. As more carbon is left behind, it will lead to a decrease in total heat release. The char yield of a material can be measured by a micro combustion calorimeter (MCC) at 1 C/s heating rate under nitrogen from 150 to 950 C using method A of ASTM D7309 (pyrolysis under nitrogen). In some embodiments, the composite may have a char yield of greater than or equal to 50 mass %. The chemical composition may have a char yield of greater than or equal to 60 mass %, or greater than or equal to 70 mass %. In comparison, a standard polystyrene sample may have a char yield of 0% under the same test conditions.

The composite may, in some embodiments, have improved thermal insulation properties. The thermal insulation properties can be measured by inherent material properties such as thermal conductivity ($\kappa$), volumetric heat capacity (Cp) and thermal diffusivity (A) in unit of $m^2/s$. Thermal conductivity can be measured by Anter Quickline-30 thermal properties analyzer according to ASTM D5930. The composite may have a thermal conductivity of 0.4 to 0.03 W/mK, or about 0.043 W/mK. A low thermal conductivity indicates that the material will have good thermal insulation properties. The composite may have a volumetric heat capacity of $0.18 \times 10^{-6}$ $J/m^3K$ and a thermal diffusivity of $0.239 \times 10^{-6}$ $m^2/s$.

In some embodiments, the chemical composition may not only have improved thermal properties, but may also have advantageous mechanical properties as well. In some embodiments, the polymer may have a storage modulus of greater than or equal to 1 GPa, as measured according to the American Society for Testing and Materials (ASTM) Standard D4065. For instance, the polymer may have a storage modulus of from 1 to 4 GPa, such as from 1 to 2 GPa. In other embodiments, the composite may have a storage modulus of greater than or equal to 9 GPa, as measured according to the American Society for Testing and Materials (ASTM) Standard D4065. For instance, the polymer may have a storage modulus of from 9 to 12 GPa, such as from 10 to 11 GPa.

The composite may, in some embodiments, be of low density, which may, in some embodiments, be due in part to the degree of infusion of chemical composition in the reinforcement material. For example, the composite may have a density of from 0.05 $g/cm^3$ to 2.05 $g/cm^3$. In some embodiments, the composite may have a density of from 0.08 $g/cm^3$ to 2.0 $g/cm^3$, or from 0.1 $g/cm^3$ to 2.0 $g/cm^3$, or from 0.13 $g/cm^3$ to 1.75 $g/cm^3$, or from 0.13 to 1.5 $g/cm^3$, or from 0.13 to 1.25 $g/cm^3$. In some embodiments, the composite may have a density of from 0.25 $g/cm^3$ to 1.25 $g/cm^3$, or from 1 $g/cm^3$ to 1.5 $g/cm^3$. In some embodiments, the composite may have a density of greater than 2 $g/cm^3$, such as greater than 3 $g/cm^3$, or greater than 5 $g/cm^3$. The density of the composite may also allow the composite to have sufficient strength, as previously described, without undesirably increasing the weight of the composite.

EXAMPLES

In order that the previously described embodiments may be more easily understood, reference is made to the following examples that illustrate one or more features of the present disclosure. The examples are in no ways limiting in scope.

The following examples illustrate one or more of the embodiments described in the disclosure.

Example 1

To prepare Example 1, 10 g of MG 2000 resin, a thermoset resin made by Cornerstone Research Group, Inc. (Dayton, Ohio) was placed in an aluminum mold. The sample was placed in a programmable oven and heated to 250° C. at a heating rate of 20° C./hr. The sample was further cured by heating at 250° C. for 4 hrs. The sample was then removed from the oven and allowed to cool to room temperature before demolding to produce Example 1.

Example 2

To prepare Example 2, a test panel of syntactic polymer composite material was fabricated by dissolving MG 1971 Resin (100 g), a thermoset resin made by Cornerstone Research Group, Inc. (Dayton, Ohio), into acetone (40 g). K1 Microballoon, available from 3M (40 g) was mixed in by hand. The solvent was allowed to evaporate for 12 hours at room temperature followed by heating in an oven at 65° C. for 8 hours. The sample was then cured by ramping the oven temperature to 180° C. over a period of 12 hours followed by holding at 180° C. for 1 hour. The cure was continued by further ramping the temperature to 250° C. over a period of 4 hours followed by allowing the sample to cool down to ambient temperature to form the test panel.

Example 3

To prepare Example 3, a test panel of syntactic polymer composite material was fabricated by dissolving MG 1971 Resin (100 g), a thermoset resin made by Cornerstone Research Group, Inc. (Dayton, Ohio), into acetone (40 g). Expanded glass beads (0.5-1 mm grain size), available from Poraver (Innisfil, Canada) (75 g) was mixed in by hand. The solvent was allowed to evaporate for 24 hours at room temperature followed by heating in an oven at 50° C. for 8 hours. The sample was then cured by ramping the temperature to 180° C. over a period of 12 hours followed by holding at 180° C. for 1 hour. The cure was continued by further ramping the temperature to 250° C. over a period of 4 hours followed by allowing the sample to cool down to ambient temperature to form the test panel.

Example 4

To prepare Example 4, a test panel of continuous fiber reinforced polymer composite material was fabricated using a hand layup process. The polymer resin was MG 22000 Resin, a thermoset resin made by Cornerstone Research Group, Inc. (Dayton, Ohio), and the reinforcement material was 4 plies carbon fibers (T650 de-sized plain weave) from BFG Industries (Greensboro, N.C.). The resin was infiltrated into the reinforcement using a hand pre-impregnation process whereby the resin was applied to release film using a 6 mil doctor blade. The coated film was allowed to dry after which time it was placed coated surface down onto the carbon fiber reinforcement. Using a consumer grade iron, the coated film was transferred from the release film into the reinforcement ply. The reinforcement plies were then laid up in an aluminum mold using a 0/90 layup schedule, covered and sealed with a vacuum bag film. Vacuum pressure (28 in. Hg) was applied and the vacuum bagged sample was heated in an autoclave at 100 psi while being heated to 220° C. at a heating rate of 1.1° C./min. The sample was further held at 220° C. for an additional 4 hours before allowed to cool to room temperature to produce the test panel.

Comparative Example 1

Table 1 shows a comparison between the flammability performances as measured by micro-combustion calorimeter on 250° C. cured MG 2000 and MG 3000 versus polystyrene standard. The data was obtained from experiments conducted with micro-combustion calorimeter.

TABLE 1

Heat Release Rate data comparison

| Sample | Ave. Char Yield (%) | Peak HRR Value (W/g) | Total HR (kJ/g) |
|---|---|---|---|
| MG 2000 | 69.35 | 41 | 4.6 |
| MG 3000 | 68.95 | 35 | 5.0 |
| Polystyrene standard | −0.14* | 1092 | 39.3 |

*Polystyrene sample effectively completely combusted and did not left any residue within experimental error.

Table 2 shows a comparison between the flammability performance of MG 2000 and M 3000 with various commonly used fire resistant polymers. The data was obtained from experiments conducted with micro-combustion calorimeter.

TABLE 2

Flammability comparison with flame resistant polymers.

| Sample | Peak HRR (W/g)) | Total HRR (kJ/g) |
|---|---|---|
| MG 2000 | 41 | 4.6 |
| MG 3000 | 35 | 5 |
| Ultem ™ Polyetherimide | 187.4 | 6.72 |
| Phenolic Resin | 80 | 6.5 |
| Poly(phenylene sulfide) | 400 | 11.2 |
| Nylon | 700 | 19 |

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

What is claimed is:

1. A chemical composition comprising at least one of Formula I or Formula II:

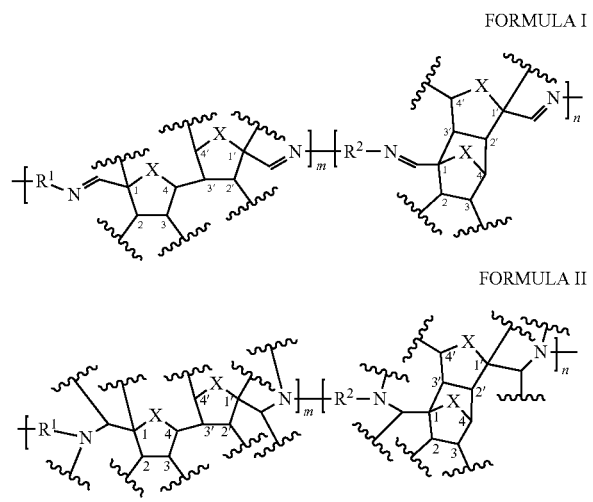

FORMULA I

FORMULA II wherein:
where n and m are each an integer greater than or equal to 1,
at least one of $R^1$ or $R^2$ comprises an aromatic moiety, and
X is selected from the group consisting of $CH_2$, NH, O, S, $SO_2$, and combinations thereof.

2. The chemical composition of claim 1, wherein X is selected from the group consisting of $CH_2$, NH, O, S, and combinations thereof.

3. The chemical composition of claim 1, wherein n, m, or both, are integers from 1 to 200.

4. The chemical composition of claim 1, wherein $R^1$, $R^2$, or both comprise one or more of a phenyl group, a naphthyl group, a benzyl group, or a 4-cyanophenyl group.

5. The chemical composition of claim 1, wherein $R^1$, $R^2$, or both comprise one or more of an ether group, a sulfur group, a sulfonyl group, an imine group, an amide group, a methylene group, a dialkyl methylene group, an isopropyl group, a trifluoromethyl group, a hexafluoroisopropyl group, a carbonyl group, a methyl group, a propyl group, a dimethylamino group, or a boronic acid group.

6. The chemical composition of claim 1, wherein $R^1$, $R^2$, or both comprise one or more of an (1-(5-(1-(5-Formyl-2-furfyl)-1-methylethyl)-2-furfyl)-1-methylethyl), diphenylsulfone, diphenyl sulfone, diphenyl ether, 1,3-bis(phenoxy)-benzene, moiety, 4,4'-(1,3-phenylenedioxy)dianiline, 1,3-bis(3-aminophenoxy)benzene, 4,4'-oxydianiline, 4-aminophenyl sulfone, 3-aminophenyl sulfone, or isophthalaldehyde derivatives.

7. The chemical composition of claim 1, wherein the composition is used in one or more of the architecture, coating, composite, construction, oil and gas, mining, defense, space, aerospace, automotive, marine, or electronic industries.

8. A composite comprising the chemical composition of claim 1 and at least one reinforcement material.

9. The composite of claim 8, wherein the reinforcement material comprises one or more of carbon fiber, glass fiber, aramid fiber, polymer fiber, felt material, carbon felt, aerogel, syntactic material, random fiber mats, scrims, chopped fibers, fiber knits, unidirectional fiber plies, three-dimensional fiber weaves, three-dimensional fiber preforms, plain weave fabrics, twill fabrics, harness satin fabrics or combinations thereof.

10. The composite of claim 8, wherein the composite is an article used in at least one of an architecture, coating, composite, construction, oil and gas, mining, defense, space, aerospace, automotive, marine, or electronic industries.

11. The chemical composition of claim 1, wherein X is O.

12. The chemical composition of claim 1, wherein X is NH.

13. The chemical composition of claim 1, wherein $R^1$, $R^2$, or both comprise a phenyl group.

14. The chemical composition of claim 1, wherein $R^1$, $R^2$, or both comprise a naphthyl group.

15. The chemical composition of claim 1, wherein $R^1$, $R^2$, or both comprise one or more of an ether group, an imine group, an amide group, a hexafluoroisopropyl group, or an isopropyl group.

16. The chemical composition of claim 1, wherein $R^1$, $R^2$, or both comprise a diphenyl ether moiety.

17. The chemical composition of claim 1, wherein $R^1$, $R^2$, or both comprise an isophthalaldehyde derivative.

18. The composite of claim 8, wherein the reinforcement material comprises one or more of carbon fiber, glass fiber, three-dimensional fiber preforms, or combinations thereof.

* * * * *